United States Patent
Peleg et al.

(10) Patent No.: US 6,434,280 B1
(45) Date of Patent: Aug. 13, 2002

(54) SYSTEM AND METHOD FOR GENERATING SUPER-RESOLUTION-ENHANCED MOSAIC IMAGES

(75) Inventors: Shmuel Peleg, Jerusalem; Assaf Zomet, Karkur, both of (IL)

(73) Assignee: GenTech Corporation, Tokyo (JP)

( * ) Notice: Subject to any disclaimer, the term of this patent is extended or adjusted under 35 U.S.C. 154(b) by 0 days.

(21) Appl. No.: 09/188,518

(22) Filed: Nov. 9, 1998

Related U.S. Application Data (60) Provisional application No. 60/065,059, filed on Nov. 10, 1997.

(51) Int. Cl.[7] .......................... G06K 9/32; G06F 15/00; G06T 17/00
(52) U.S. Cl. ...................... 382/299; 382/295; 382/294; 358/1.2; 345/428
(58) Field of Search ................................. 382/299, 277, 382/266, 282, 284, 294, 295, 298, 302, 254, 255, 173; 395/109, 102; 345/698, 428; 358/1.2

(56) References Cited

U.S. PATENT DOCUMENTS

| | | | | |
|---|---|---|---|---|
| 4,485,409 A | * | 11/1984 | Schumacher | ................ 358/294 |
| 4,649,568 A | * | 3/1987 | Kiesel et al. | .................. 382/41 |
| 5,617,224 A | * | 4/1997 | Ichikawa et al. | ........... 358/530 |
| 5,802,210 A | * | 9/1998 | Kurata et al. | ................ 382/235 |
| 5,991,444 A | * | 11/1999 | Burt et al. | ................... 382/232 |
| 6,021,256 A | * | 2/2000 | Ng et al. | ..................... 395/109 |
| 6,075,905 A | * | 6/2000 | Herman et al. | ............. 382/284 |
| 6,137,498 A | * | 10/2000 | Silvers | ........................ 345/435 |

* cited by examiner

Primary Examiner—Leo Boudreau
Assistant Examiner—Yosef Kassa
(74) Attorney, Agent, or Firm—Richard A. Jordan (57) ABSTRACT

A super-resolution-enhanced mosaic image generating system is provided for generating a super-resolution-enhanced mosaic image from a plurality of image frames, each image frame being associated with image data representative of an image of a portion of a scene. The mosaic image generating system comprises a mosaic image generator and a super-resolution generator. The mosaic image generator uses the image data from the image frames to generate mosaic image data representing a mosaic image. The super-resolution generator uses the mosaic image data and the image data from the image frames to generate the super-resolution-enhanced mosaic image. In that process, the super-resolution generator divides the mosaic image into a plurality of patches, each patch associated with at least one image frame, and performs a super-resolution operation in connection with the patch and image frames associated therewith to generate the super-resolution-enhanced mosaic image.

18 Claims, 5 Drawing Sheets

SYSTEM AND METHOD FOR GENERATING SUPER-RESOLUTION-ENHANCED MOSAIC IMAGES

Provisional application No. 60/065,059, Nov. 10, 1997.

FIELD OF THE INVENTION

The invention relates generally to the field of digital image processing and more particularly to the field of mosaicing systems and methods for producing a single image from plurality of overlapping images.

BACKGROUND OF THE INVENTION

Mosaicing and super resolution are two methodologies for combining information from a plurality of frames of image data into a single frame. By use of mosaicing, a single panorama mosaic image (hereinafter, generally a "mosaic image") can be generated from a sequence of image data frames taken by, for example, a video camera that has been panned across a scene or otherwise translated over the scene. The resulting mosaic image can, in a single image, provide a more extensive view of the scene than would typically be possible in a single image recorded by a camera with a normal lens, and would avoid distortions which are common in wide-angle and especially so-called "fish-eye" lenses. Methods of generating a mosaic image from a sequence of video images are described in, for example, M. Irani, et al., "Mosaic Based Representations Of Video Sequences And Their Applications," Fifth Int'l Conf. on Computer Vision, 1995, pp. 605–611 [hereinafter "Irani(1)"], and in S. Peleg, et al., "Panoramic Mosaics By Manifold Projection," IEEE Conf. On Computer Vision And Pattern Recognition, 1997, pp 338–343 [hereinafter "Peleg"].

Generally, mosaicing involves several phases, including an alignment phase and an integration phase. In the alignment phase, information from overlapping regions of pairs of images is used to determine respective transformations which best align the respective pairs of images. In particular, in each image features are located relative to a coordinate system associated with the respective image, and in alignment the geometric transformations are determined which relate the coordinates of the features in the overlapping region of one image to the coordinate system of the other image, or to a common coordinate system. After the transformations have been determined for the images to be used in generating the mosaic image, the mosaic image can be generated during the integration phase. In the integration phase, the images are integrated into a single mosaic image using the transformation information generated during the alignment phase. In that operation, several methodologies can be used to integrate the overlapping regions of respective images into a single image in the mosaic. In one methodology, the overlapping region from only one image is used in the mosaic, and the corresponding overlapping regions in the other image or images are ignored. In another methodology, the overlapping regions from all of the images are combined in the mosaic. In the second methodology, the contributions from the overlapping regions of the images may be averaged (that is, weighted equally), or they may be weighted according to a selected weighting scheme. As the images are combined into the mosaic, they may be processed to, for example, provide continuity in the illumination level as among the portions provided by the individual images.

The accuracy of the alignment as among the respective images is important in the quality of the mosaic. Alignment accuracy depends on a number of factors, including the relative motion of the camera and objects in the scene, lens distortions, the three-dimensional structure of the scene and noise. When, for example, an overlapping region is taken only from a single image, as described in Peleg, alignment is mostly important along the seams between regions taken from different images. In many cases, for example, rigid translational and rotational transformations for the overlapping region of the respective pairs of images are sufficient to give good alignment along the seams. But alignment limited to rigid transformations may be less accurate in overlapping regions which are not on the seam. Even though rigid transformations are not the most accurate, they are commonly used as they reduce the amount of time required to compute the alignment during the alignment phase, and can lead to reduced global distortions in the mosaic.

By use of super-resolution techniques, information from overlapping regions of multiple image frames can be used to improve the resolution of, and reduce noise in, a resultant image frame. In one super-resolution methodology, described in M. Irani, et al., "Motion Analysis For Image Enhancement Resolution, Occlusion, And Transparency," Jour. Visual Communication And Image Representation, Vol. 4, No. 4, Dec., 1993, pp. 324–335, particularly section 3 thereof [hereinafter "Irani(2)"], a super-resolution methodology is described in which, starting with an initial guess as to an appropriate super-resolution image of a scene, a plurality of low-resolution images are generated and compared to actual low-resolution images which were recorded of the scene. By determining differences between the generated and actual low-resolution images, an error function is developed which is used in updating the initial guess super-resolution image. This process can be repeated through a series of iterations until a final super-resolution image is generated with enhanced resolution over the actual low-resolution images.

A problem arises in connection with use of super-resolution techniques for mosaic images, particularly in connection with the use of information from overlapping regions to try to enhance resolution of the corresponding regions of mosaic images. In particular, alignment accuracy over overlapping regions is very important for super-resolution. Super-resolution techniques can be used to improve resolution if the alignment is accurate. However, if alignment is not accurate, super-resolution techniques can serve to degrade resolution in the mosaic image.

SUMMARY OF THE INVENTION

The invention provides a new and improved system and method for generating a super-resolution-enhanced mosaic image, using mosaicing and super-resolution methodologies, which provides for enhanced resolution of a mosaic image even if the alignment of the images used in generating the mosaic image is not accurate enough across the overlapping regions to be used directly for super-resolution.

In brief summary, the invention provides a super-resolution-enhanced mosaic image generating system for generating a super-resolution-enhanced mosaic image from a plurality of image frames, each image frame being associated with image data representative of an image of a portion of a scene. The mosaic image generating system comprises a mosaic image generator and a super-resolution generator. The mosaic image generator uses the image data from the image frames to generate mosaic image data representing a mosaic image. The super-resolution generator uses the mosaic image data and the image data from the image frames to generate the super-resolution-enhanced mosaic image. In that process, the super-resolution generator divides the mosaic image into a plurality of patches, each patch associated with at least one image frame, and performing a super-resolution operation in connection with the patch to generate the super-resolution-enhanced mosaic image.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
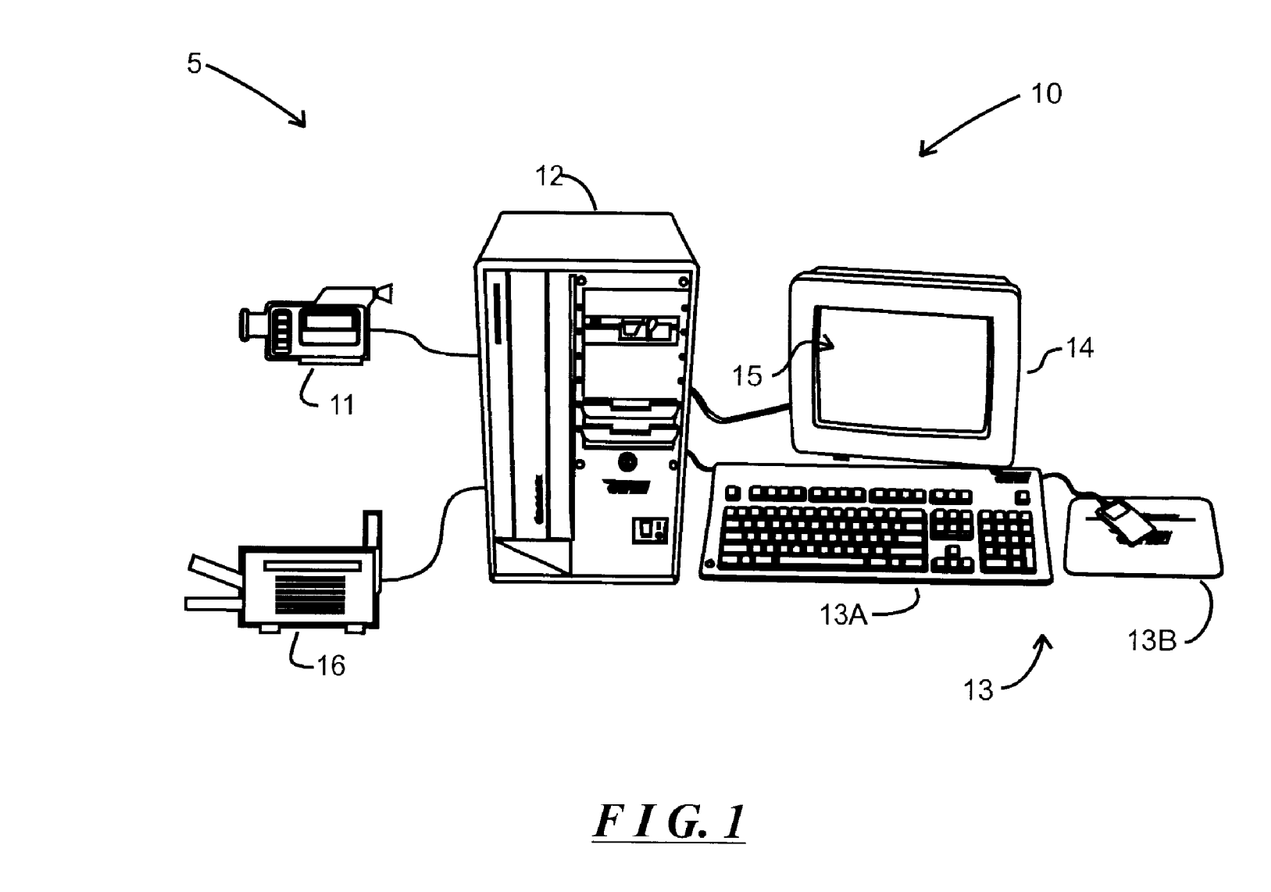
FIG. 1 depicts a super-resolution-enhanced mosaic image generating system constructed in accordance with the invention.

FIG. 1 depicts a super-resolution-enhanced mosaic image generating system 5 constructed in accordance with the invention. With reference to FIG. 1, the system 10 includes a computer system 10 and a video camera 11. An operator (not shown) may use the video camera 11 to pan or otherwise translate the camera across a scene to facilitate generation a sequence of video image frames of the scene for provision to the computer system 10 for processing. As will be described below in connection with FIGS. 2 and 3, video image frames in the sequence will overlap on at least a pair-wise basis, and the computer system 10 will process the video image frame sequence to generate a super-resolution-enhanced mosaic image. Generally, the super-resolution-enhanced mosaic image generated by system 5 will be an image of a larger portion of the scene than any of the video image frames in the sequence, with portions of the image (that is, the super-resolution-enhanced mosaic image) being provided by ones of the video image frames.

The computer system 10 used in the super-resolution-enhanced mosaic image generating system 5 may comprise any suitable computer system, including, for example, a personal computer or computer workstation, as well as a mini- or main-frame computer, for performing processing operations in connection with the video image frame sequence provided thereto by the video camera 11 to generate the super-resolution-enhanced mosaic image. In one embodiment, the computer system 10 includes a processor module 12 and operator interface elements comprising operator input components such as a keyboard 13A and/or a mouse 13B (generally identified as operator input element(s) 13) and an operator output element such as a video display device 14. The illustrative computer system 10 is of the conventional stored-program computer architecture. The processor module 12 includes, for example, processor, memory and mass storage devices such as disk and/or tape storage elements (not separately shown) which perform processing and storage operations in connection with digital data provided thereto.

The operator input element(s) 13 are provided to permit an operator to input information to control processing. The video display device 14 is provided to display output information generated by the processor module 12 on a screen 15 to the operator, including data that the operator may input for processing, information that the operator may input to control processing, as well as information generated during processing. In connection with the super-resolution-enhanced mosaic image generating system 5, information displayed by the video display device 14 can include, for example, one or more video image frames from the sequence provided to the computer system 10 by the video camera 11, information defining the super-resolution-enhanced mosaic image generated by the computer, and images representing information from intermediate operations performed by the computer system 10 in generating the super-resolution-enhanced mosaic image. In one embodiment, the processor module 12 generates information for display by the video display device 14 using a so-called "graphical user interface" ("GUI"), in which information for various applications programs is displayed using various "windows." Although the computer system 10 is shown as comprising particular components, such as the keyboard 13A and mouse 13B for receiving input information from an operator, and a video display device 14 for displaying output information to the operator, it will be appreciated that the computer system 10 may include a variety of components in addition to or instead of those depicted in FIG. 1.

The computer system 10 further includes, in one embodiment, a hardcopy output device represented by printer 16, which can generate hardcopy output representing the super-resolution-enhanced mosaic image generated by the computer system 10, as well as images representing the information generated from intermediate operations performed by the computer system 10 in generating the super-resolution-enhanced mosaic image.

Figure 2:
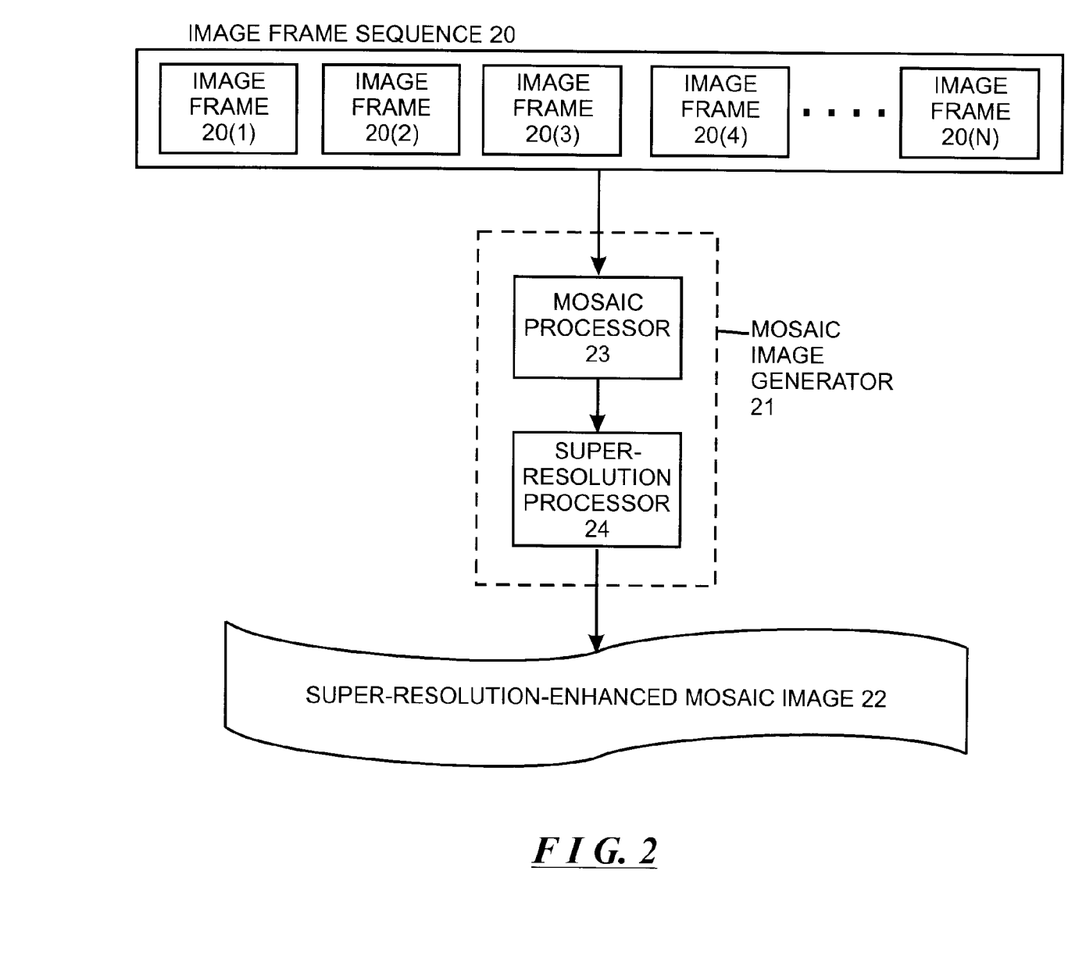
FIG. 2 depicts a functional block diagram of the super-resolution-enhanced mosaic image generating system depicted in FIG. 1.

FIG. 2 depicts a functional block diagram of the super-resolution-enhanced mosaic image generating system 5 depicted in FIG. 1. With reference to FIG. 2, system 5 includes an image frame sequence 20, a mosaic image generator 21 and a super-resolution-enhanced mosaic image 22. The image frame sequence 20, recorded by the camera 11, comprises a plurality of image frames 20(1) through 20(N) (generally identified by reference numeral 20(n)), each image frame 20(n) representing a portion of the scene as recorded by the camera 11. Preferably, the image frames 20(n) are overlapping on at least a pair-wise basis, that is, a portion of image frame 20(n) will overlap with both the preceding image frame 20(n−1) in the sequence and the succeeding image frame 20(n+1) in the sequence. It will be appreciated that, depending on the manner and rate at which the operator pans across the scene, and the rate at which the camera 11 records image frames, portions of the image frame 20(n) may also overlap with other image frames 20(n−2), . . . ,20(1) and 20(n+2), . . . ,20(N), if any, in the image frame sequence 20.

As is conventional, each image frame 20(n) is represented by a digital data array (not separately shown) having a plurality of array elements organized in a plurality of rows and columns, with each array element comprising a digital data value that represents the intensity of a correspondingly-positioned region, that is, a picture element or "pixel," in the associated image frame 20(n). Conventionally, within each digital data array, the data associated with each pixel, which will be referred to as a "pixel value," will identify the intensity of the image in the region of the image frame 20(n) associated with the pixel. If the image frames 20(n) are in monochrome form, such as in gray scale form, the pixel value associated with each pixel will generally comprise a single numerical value that identifies the intensity level of the region of the respective image frame with which the pixel is associated, specifically indicating the degree of lightness or darkness of the region. It will be appreciated that the number of possible intensity values that may be represented for each pixel will depend on the number of digital data bits which are used in the representation of the pixel value associated with the pixel. If, for example, eight bits are used for each pixel, two hundred and fifty six (that is, $2^8$) intensity values may be represented for each pixel, extending from, for example, zero for a black pixel to two hundred and fifty five for a white pixel.

On the other hand, if the image frames is in color form, the pixel value associated with each pixel will generally comprise several numerical values, one numerical value being associated with each color or other component in the color space in which the image frames 20(n) are encoded. Each numerical value will identify an intensity value for the respective color space component for the pixel. If the image frames 20(n) are in color form, the image data associated with the color space components can be processed separately in the same manner as would be performed for a grayscale image, and so in the following will describe operations performed in connection with a single grayscale or color component.

In either case, the digital data representing image frames 20(n) may be provided to the computer 10 by the camera 11, or the camera may provide the image frames 20(n) to the computer 10, which will convert the image frames 20(n) to digital form in a conventional manner.

The mosaic image generator 21, which in one embodiment comprises the computer system 10 described above in connection with FIG. 1, processes the image frames 20(n) comprising the image frame sequence 20, or more specifically the digital data arrays associated therewith, to facilitate generation of the super-resolution-enhanced mosaic image 22. As with the image frames 20(n), the super-resolution-enhanced mosaic image 22 is represented by a digital data array (not separately shown) organized in a plurality of rows and columns, with each array element comprising a pixel value that represents the intensity of a correspondingly-positioned pixel in the super-resolution-enhanced mosaic image 22. The pixel values generated for the super-resolution-enhanced mosaic image 22 can be used in displaying the image 22 on the screen 15 of the video display device 14, printing by the printer 16, or other conventional operations which will be apparent to those skilled in the art.

As noted above, the mosaic image generator 21 processes the digital data arrays associated with the image frames 20(n) to generate the digital data array representing the super-resolution-enhanced mosaic image 22. In the following, "image frames 20(n)" and "super-resolution-enhanced mosaic image 22" will be used to refer both to the respective image frames and images and to the digital data arrays associated therewith. In accordance with the invention, the mosaic image generator 21 generates from the image frames 20(n), the super-resolution-enhanced mosaic image 22 as a single mosaic image with the same geometric characteristics as would be provided by a conventional mosaicing technique, and with improved image quality and resolution, as would be provided by a super-resolution technique in connection with a non-mosaic image. For example, use of rigid transformations for mosaicing may provide good alignment across seams, but alignment over other overlapping regions may be poor, which might otherwise lead to reduced resolution if super-resolution techniques were to be used.

Figure 3A:
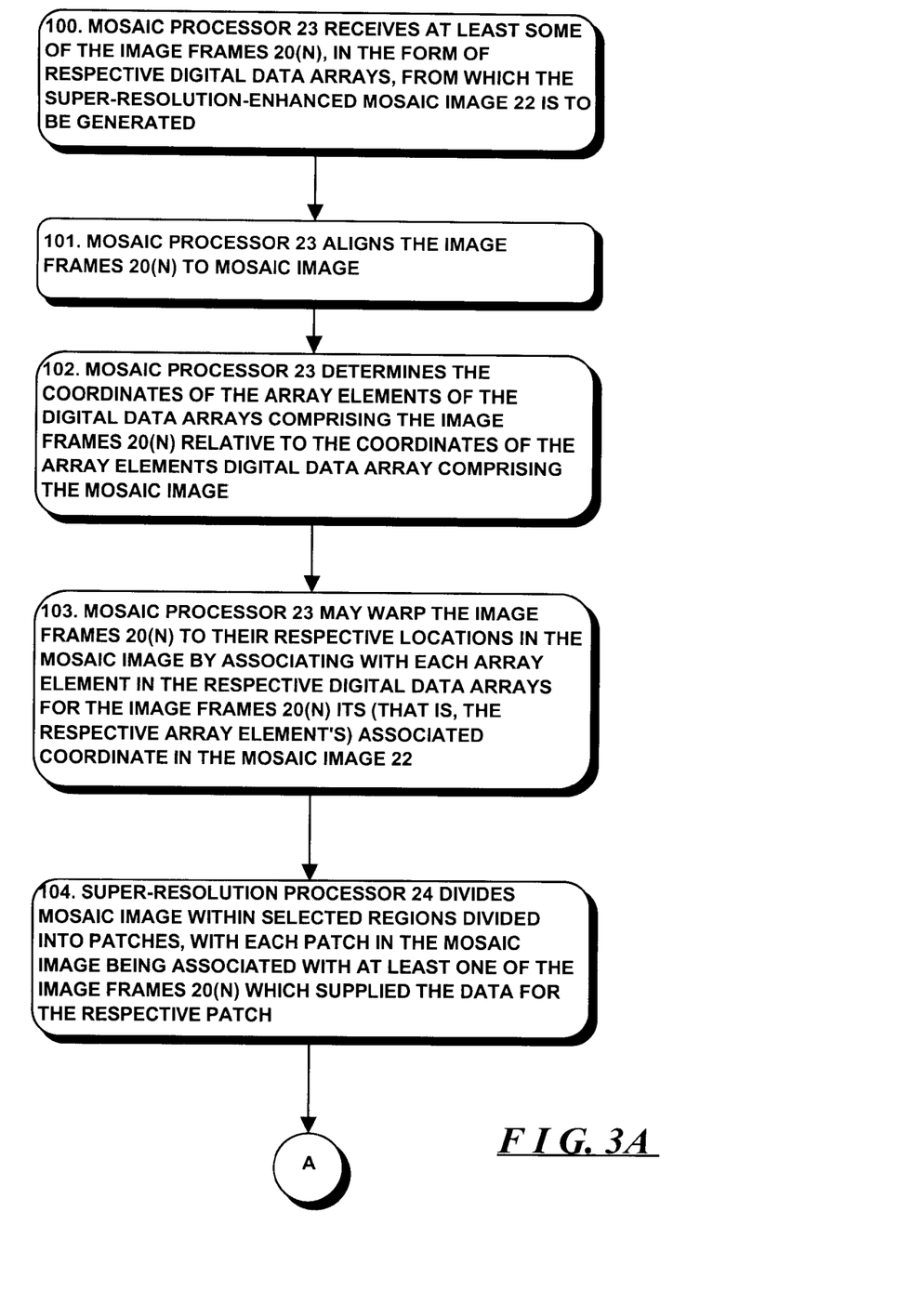
FIGS. 3A through 3C together comprise a flowchart depicting operations performed by the super-resolution-enhanced mosaic image generating system.

In further accordance with the invention, the mosaic image generator 21 includes a mosaic processor 23 and a super-resolution processor 24. Generally, the mosaic processor 23 processes the image frames 20(n) of the image frame sequence 20 to generate a mosaic image, and the super-resolution processor 24 processes the mosaic image generated by the mosaic image processor to generate the super-resolution-enhanced mosaic image 22. Operations performed by the mosaic processor 23 and super-resolution processor 24 in connection with generation of the super-resolution-enhanced mosaic image 22 from the image frames 20(n) will be described in connection with a flowchart depicted in FIGS. 3A through 3C. With reference to FIG. 3A, the mosaic processor 23 initially receives at least some of the image frames 20(n), in the form of respective digital data arrays, from which the super-resolution-enhanced mosaic image 22 is to be generated (step 100) and generates a mosaic image using any convenient mosaicing methodology, such as that described in the Irani(1) article cited above. Generally, in generating the mosaic image, the mosaic processor 23 will align the image frames 20(n) (step 101) and determine the coordinates of the array elements of the digital data arrays comprising the image frames 20(n) relative to the coordinates of the array elements digital data array comprising the mosaic image (step 102). In the alignment step (step 101), the mosaic processor will generate a set of parameters that relate the transformation for the image frame 20(n) to the mosaic image. Following step 102, the mosaic processor may warp the image frames 20(n) to their respective locations in the mosaic image by associating with each array element in the respective digital data arrays for the image frames 20(n) its (that is, the respective array element's) associated coordinate in the mosaic image 22 (step 103).

Figure 3B:
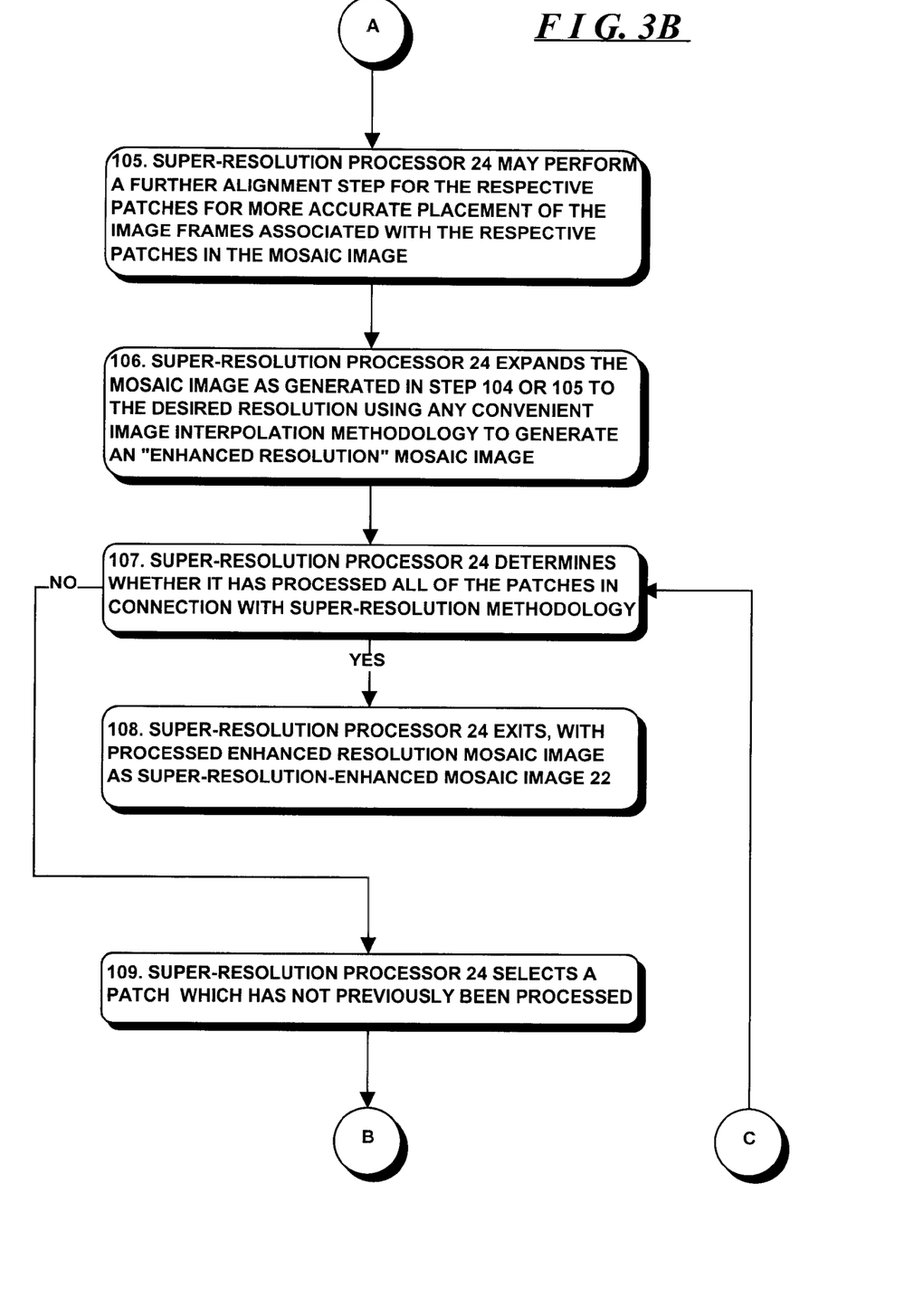
Figure 3C:
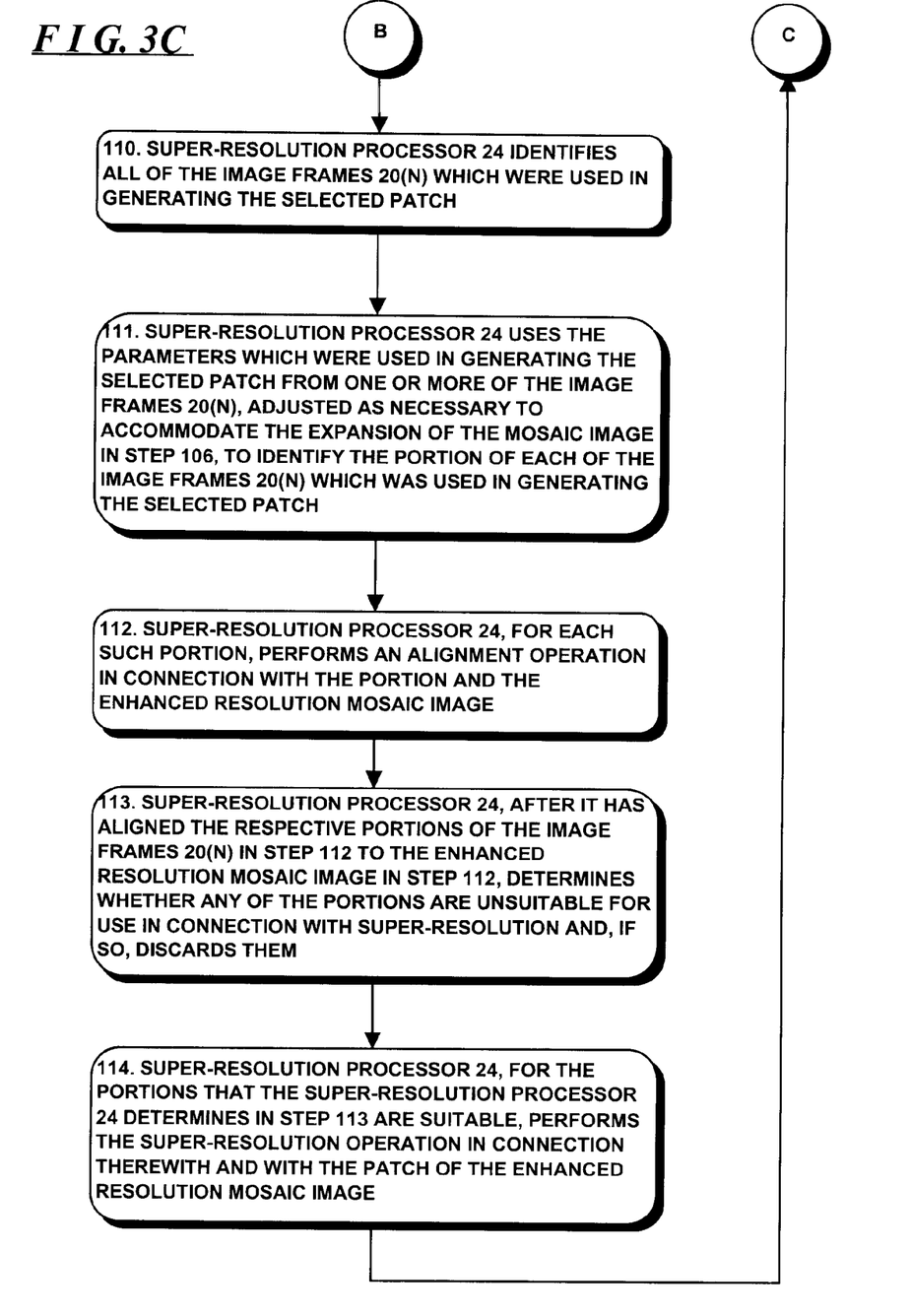

At the end of step 103, the mosaic processor 23 will have generated the mosaic image, and the super-resolution processor 24 will process the mosaic image to generate the super-resolution-enhanced mosaic image 22. Following step 103, the super-resolution processor 24 divides the mosaic image, within at least selected regions, into patches (step 104), with each patch in the mosaic image being associated with at least one of the image frames 20(n) which supplied the data for the respective patch. Optionally, after the patches of the mosaic image are associated with their respective patches, the mosaic processor 23 may perform a further alignment step for the respective patches for more accurate placement of the image frames associated with the respective patches in the mosaic image (step 105). Thereafter, the super-resolution processor 24 performs some preparatory operations followed by a super-resolution operation in connection with each of the patches of the mosaic image to generate the super-resolution-enhanced mosaic image 22. Initially, the super-resolution processor 24 expands the mosaic image as generated in step 104 or 105 to the desired resolution using any convenient image interpolation methodology to generate an "enhanced resolution" mosaic image (step 106). That is, for each array element in the digital data array comprising the mosaic image, the super-resolution processor 24 provides a predetermined number of "enhanced resolution" array elements arranged in a plurality of rows and columns, and generates a value for each enhanced resolution array element from the values of the array elements of the original digital data array for the mosaic image using any convenient interpolation methodology. One illustrative interpolation methodology comprises the well-known bi-linear interpolation methodology. The enhanced resolution array elements define the enhanced resolution mosaic image which will be processed in the super-resolution operation in connection with the image frames 20(n) to generate the super-resolution-enhanced mosaic image 22.

After generating enhanced resolution mosaic image in step 106, the super-resolution processor 24 performs the super-resolution operation in connection with each of the patches and the image frames 20(n) associated therewith. The super-resolution processor 24 performs the super-resolution operation in a series of iterations, in each iteration processing one of the patches identified for the mosaic image in step 104. Thus, in each iteration, the super-resolution processor 24 initially determines whether it has processed all of the patches (step 107) and, if it makes a positive determination in step 107, exits (step 108). If, on the other hand, the super-resolution processor 24 makes a negative determination in step 107, that is, if it determines that it has not processed all of the patches, it proceeds to process a patch in the mosaic image. Initially, the super-resolution processor 24 selects a patch which has not previously been processed (step 109), and identifies all of the image frames 20(n) which were used in generating the selected patch (step 110). Thereafter, using the parameters, that is, the translational and rotational transformation, which were used in generating the selected patch from one or more of the image frames 20(n), adjusted as necessary to accommodate the expansion of the mosaic image in step 106, the super-resolution processor 24 identifies the portion of each of the image frames 20(n) which was used in generating the selected patch (step 111). For each such portion , the super-resolution processor 24 performs an alignment operation in connection with the portion and the enhanced resolution mosaic image (step 12). The alignment operation in step 112 is performed only using the portion of the image frame 20(n) which was used in generating the selected patch and, perhaps, a small neighborhood surrounding the selected patch, and a different alignment methodology may be used than was used in step 101. For example, if the super-resolution processor 24 used a methodology in which a rigid transformation is used, which yields three parameters, it (that is, the mosaic image generator 21) may use an affiance alignment methodology, which can yield six parameters, or a planar perspective alignment methodology, which can yield eight parameters, for use in the alignment in step 112. Since, in step 112, only the portions of the image frames 20(n) which were used in generating the patch are aligned, rather than the entire image frames 20(n), and since a more accurate alignment methodology can be used, the alignment performed in step 112 will likely be more accurate than in step 101.

The super-resolution processor 24, after it has aligned the respective portions of the image frames 20(n) in step 111 to the enhanced resolution mosaic image in step 111, determines whether any of the portions are unsuitable for use in connection with super-resolution and, if so, discards them (step 113). A portion may be unsuitable if, for example, its alignment is relatively poor, or if its image quality is poor based on criteria such as lack of sharpness, noise, lack of dynamic range and the like. For the portions that the super-resolution processor 24 determines in step 113 are suitable, it (that is, the super-resolution processor 24) performs the super-resolution operation in connection therewith and with the patch of the enhanced resolution mosaic image (step 114). In step 114, the mosaic image generator 21 can use any suitable super-resolution methodology, such as the methodology described in the Irani(2) paper. In performing the super-resolution operation, the result of the operation may be improved by adjusting the values of the array elements of the portions to account for such things as differences in camera gain as between the image frame portions which are used in the super-resolution operation in step 114. This can be accomplished, by, for example, ensuring that the average value of each image frame portion is the same, using only high frequencies and so forth, as will be apparent to those skilled in the art. Alternatively, the resulting mosaic may be improved by using only a single image frame portion which has the best image quality, or by using the average or median of all of the image frame portions which were deemed suitable in step 113.

Following step 114, the super-resolution processor 24 returns to step 107 to determine whether it has processed all of the patches. The super-resolution processor 24 performs steps 107 and 109 through 114 through a series of iterations until it determines in step 107 that it has processed all of the patches of the enhanced resolution mosaic image, at which point it will exit (step 108), with the processed enhanced resolution mosaic image comprising the super-resolution-enhanced mosaic image 22.

The invention provides a number of advantages. In particular, the invention provides a system and method for generating a mosaic image whose resolution is enhanced using a super-resolution methodology, and which can avoid resolution degradation which might otherwise occur. By aligning only the portions of respective ones of the image frames 20(n) which are used in generating respective patches of the mosaic image, rather than the entire respective image frame, better alignment can be achieved, which, in turn, will increase the likelihood that the super-resolution operation will result in enhanced resolution in the mosaic image.

It will be appreciated that numerous modifications may be made to the system 5 described herein. For example, although specific mosaicing and super-resolution methodologies have been referenced herein, specifically those in the Irani(1) and Irani(2) papers, it will be appreciated that other such methodologies can be used.

In addition, although the mosaic image generator 21 has been described as generating an enhanced resolution mosaic image in step 106, it will be appreciated that it may skip that step if only noise reduction and de-blurring is to be performed to generate the super-resolution-enhanced mosaic image 22. In that case, the operations performed by the mosaic image generator 21 in steps 107 through 114 will be performed on the mosaic image generated in steps 101, rather than the enhanced resolution mosaic image.

Furthermore, it will be appreciated that the camera 11 may record and store the respective image frames 20(n) of the image frame sequence in any convenient manner and form, including, for example, on in magnetic form such as on magnetic tape or disk, electrical form such as in semiconductor memory, or optical form such as a CD-ROM, or, indeed, in conventional photographic images which can be digitized by a scanner (not shown) connected to the computer system 10.

In addition, although the system 5 has been described in connection with a computer system 10 providing the mosaic processor 23 and the super-resolution processor 24, it will be appreciated that, for example, a camera may be provided with processing elements which can suffice to perform the operations described above in connection with those elements 23 and 24 to generate a super-resolution-enhanced mosaic image without the necessity of using a computer system. Similarly, a printer can be provided with such processing elements, in which case a camera can provide image frame information to a printer, which can generate the super-resolution-enhanced mosaic image without the necessity of using a computer system.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A super-resolution-enhanced mosaic image generating system for generating a super-resolution-enhanced mosaic image from a plurality of image frames, each image frame being associated with image data representative of an image of a portion of a scene, the mosaic image generating system comprising:

A. a mosaic image generator configured to use the image data from the image frames to generate mosaic image data representing a mosaic image; and B. a super-resolution generator configured to use the mosaic image data and the image data from the image frames to generate the super-resolution-enhanced mosaic image, the super-resolution generator being configured to divide the mosaic image into at least one patch, each patch being associated with a plurality of image frames, and perform a super-resolution operation in connection with the at least one patch and the associated image frames to generate the super-resolution-enhanced mosaic image;

C. the mosaic image generator being further configured to use a portion of the at least one image frame to generate the mosaic image data for the at least one patch, and the super-resolution generator being further configured, in performing the super-resolution operation, to perform an alignment operation in connection with the at least one patch and the portion.

2. A system as defined in claim 1 in which the mosaic image generator is configured to use a portion of each of said image frames to generate the mosaic image data for the at least one patch, the super-resolution generator, in performing the super-resolution operation, being configured to perform an alignment operation in connection with the at least one patch and each portion.

3. A system as defined in claim 1 in which the super-resolution generator is configured to use mosaic image data and the image data from the image frames to generate the super-resolution-enhanced mosaic image, the super-resolution generator being configured to divide the mosaic image into a plurality of patches, each patch associated with at least one image frame, and perform a super-resolution operation in connection with each of said patches and the respective at least one image frame associated therewith to generate the super-resolution-enhanced mosaic image.

4. A system as defined in claim 3 in which the mosaic image generator, in generating the mosaic image data for each of said patches, is configured to use a portion of the at least one image frame associated with the respective patch to generate the mosaic image data, the super-resolution generator, in performing the super-resolution operation, being configured to perform an alignment operation in connection each patch and the portion of the image frame associated therewith.

5. A system as defined in claim 1 in which the super-resolution generator is configured to use mosaic image data and the image data from the image frames to generate the super-resolution-enhanced mosaic image, the super-resolution generator being configured to divide the mosaic image into a plurality of patches, each patch associated with at least one image frame, and perform a super-resolution operation in connection with each of said patches and the respective at least one image frame associated therewith to generate the super-resolution-enhanced mosaic image.

6. A system as defined in claim 5 in which the mosaic image generator, in generating mosaic, image data associated with each patch, is configured to use a portion of each of the image frames associated with the patch to generate the mosaic image data therefor, the super-resolution generator, in performing the super-resolution operation, being configured to perform an alignment operation in connection each patch and each portion of each of the respective image frames associated therewith.

7. A method of generating a super-resolution-enhanced mosaic image from a plurality of image frames, each image frame being associated with image data representative of an image of a portion of a scene, the mosaic image generating system comprising:

A. generating, from the image data from the image frames, mosaic image data representing a mosaic image; and B. generating, from mosaic image data and the image data from the image frames the super-resolution-enhanced mosaic image, the super-resolution-enhanced mosaic image generating step including the steps of dividing the mosaic image into at least one patch each patch being associated with a plurality of image frames, and performing a super-resolution operation in connection with the at least one patch and the associated image frames to generate the super-resolution-enhanced mosaic image, C. the mosaic generating step including the step of using a portion of the at least one image frame to generate the mosaic image data for the at least one patch, and the super-resolution-enhanced mosaic image generating step including the step of performing an alignment operation in connection with the at least one patch and the portion.

8. A method as defined in claim 7 in which the mosaic generating step includes the step of using a portion of each of said image frames to generate the mosaic image data for the at least one patch, the super-resolution-enhanced mosaic image generating step including the step of performing an alignment operation in connection with the at least one patch and each portion.

9. A method as defined in claim 7 in which the super-resolution-enhanced mosaic image step includes the steps of dividing the mosaic image into a plurality of patches, each patch associated with at least one image frame, and performing a super-resolution operation in connection with each of said patches and the respective at least one image frame associated therewith to generate the super-resolution-enhanced mosaic image.

10. A method as defined in claim 9 in which the mosaic generating step includes the step of using a portion of the at least one image frame associated with the respective patch to generate the mosaic image data, and the super-resolution-enhanced mosaic image generating step includes the step of performing an alignment operation in connection each patch and the portion of the image frame associated therewith.

11. A method as defined in claim 9 in which each patch is associated with a plurality of image frames, the super-resolution-enhanced mosaic image generating step including the step of performing the super-resolution operation in connection with each patch and the plurality of image frames associated therewith.

12. A method as defined in claim 11 in which the mosaic generating step includes the step, in generating mosaic image data associated with each patch, of using a portion of each of the image frames associated with the patch to generate the mosaic image data therefor, and the super-resolution-enhanced mosaic image generating step includes the step of performing an alignment operation in connection each patch and each portion of each of the respective image frames associated therewith.

13. A computer program product as defined in claim 12 in which the mosaic image generator module is configured to, in enabling the computer to generate mosaic image data associated with each patch, enable the computer to use a portion of each of the image frames associated with the patch to generate the mosaic image data therefor, the super-resolution generator module being configured to, in enabling the computer to perform the super-resolution operation, enable the computer to perform an alignment operation in connection each patch and each portion of each of the respective image frames associated therewith.

14. A computer program product for use in connection with a computer to provide a super-resolution-enhanced mosaic image generating system for generating a super-resolution-enhanced mosaic image from a plurality of image frames, each image frame being associated with image data representative of an image of a portion of a scene, the computer program product comprising a computer-readable medium having encoded thereon:

A. a mosaic image generator module configured to enable the computer to use the image data from the image frames to generate mosaic image data representing a mosaic image; and B. a super-resolution generator module configured to enable the computer to use the mosaic image data and the image data from the image frames to generate the super-resolution-enhanced mosaic image, the super-resolution generator module being configured to enable the computer to divide the mosaic image into at least one patch, each patch being associated with a plurality of image frames, and perform a super-resolution operation in connection with the at least one patch and the associated image frames to generate the super-resolution-enhanced mosaic image;

C. the mosaic image generator module being further configured to enable the computer to use a portion of the at least one image frame to generate the mosaic image data for the at least one patch, and the super-resolution generator module being further configured to, in enabling the computer to perform the super-resolution operation, enabling the computer to perform an alignment operation in connection with the at least one patch and the portion.

15. A computer program product as defined in claim 14 in which the mosaic image generator module is configured to enable the computer to use a portion of each of said image frames to generate the mosaic image data for the at least one patch, the super-resolution generator module being configured to, in enabling the computer to perform the super-resolution operation, enable the computer to perform an alignment operation in connection with the at least one patch and each portion.

16. A computer program product as defined in claim 14 in which the super-resolution generator module is configured to enable the computer to use mosaic image data and the image data from the image frames to generate the super-resolution-enhanced mosaic image, the super-resolution generator module being configured to enable the computer to divide the mosaic image into a plurality of patches, each patch associated with at least one image frame, and perform a super-resolution operation in connection with each of said patches and the respective at least one image frame associated therewith to generate the super-resolution-enhanced mosaic image.

17. A computer program product as defined in claim 16 in which the mosaic image generator module being configured to, in enabling the computer to generate the mosaic image data for each of said patches, enable the computer to use a portion of the at least one image frame associated with the respective patch to generate the mosaic image data, the super-resolution generator module being configured to, in enabling the computer to perform the super-resolution operation, enable the computer to perform an alignment operation in connection each patch and the portion of the image frame associated therewith.

18. A computer program product as defined in claim 16 in which each patch is associated with a plurality of image frames, the super-resolution generator module being configured to enable the computer to perform the super-resolution operation in connection with each patch and the plurality of image frames associated therewith.

* * * * *